United States Patent [19]

Colbrese

[11] 4,157,492

[45] Jun. 5, 1979

[54] BATTERY ACCESS SYSTEM

[76] Inventor: Nick P. Colbrese, 1840 W. 187th St., Homewood, Ill. 60430

[21] Appl. No.: 817,166

[22] Filed: Jul. 20, 1977

[51] Int. Cl.² .............................................. H02G 3/00
[52] U.S. Cl. .................................... 320/25; 191/12.4; 307/10 R; 339/29 B
[58] Field of Search ................... 320/2, 25; 307/10 R; 242/107.1; 191/12.2 R, 12.4 R; 339/29 B, 184 M; 174/52 R

[56] References Cited

U.S. PATENT DOCUMENTS

| | | | |
|---|---|---|---|
| 3,090,871 | 5/1963 | Gorman | 307/10 R |
| 3,466,453 | 9/1969 | Greenberg | 320/25 X |
| 3,665,285 | 5/1972 | Mullersman et al. | 320/2 |
| 3,942,027 | 3/1976 | Fima | 307/10 R |
| 4,079,304 | 3/1978 | Brandenburg | 320/25 |

*Primary Examiner*—Robert J. Hickey
*Attorney, Agent, or Firm*—Alter and Weiss

[57] ABSTRACT

An improved battery access system which can be used, not only to start the engine of a vehicle having a defective battery, but also to supply power to an external electrical apparatus. The system can be entirely situated under the hood of a vehicle and eliminates many of the dangers associated with battery jumping.

17 Claims, 3 Drawing Figures

BATTERY ACCESS SYSTEM

BACKGROUND OF THE INVENTION

The present invention relates in general to automotive starting systems and, in particular, to an improved battery access system.

Due to the cold of the winter months or due to a person forgetting to turn out the lights of the car, a car battery may not have enough energy to start the engine. This causes great inconvenience to the person who wishes to use the automobile. In order for the engine to be started, the battery must usually be recharged. One way of starting the engine and thus recharging the battery is to have the battery jumped.

Serious dangers exist in using the widely used type of jumper cable system which is comprised of two cables, each having at each end an alligator-type grip which allows the attachment of cable to a terminal of a battery. One danger involves the incorrect connection of the positive and negative poles of the batteries. Another danger involves battery explosion due to sparks igniting hydrogen gas given off by the battery.

In addition to eliminating the aforementioned dangers, this improved battery access system permits easy access to the battery power when needed in emergency cases, such as car trouble on the road, and also provides a method for obtaining direct current electricity for emergency lighting uses.

Among the prior art in jumper systems is the device by A. W. Greenberg, U.S. Pat. No. 3,466,453, entitled Electrical System for Vehicles. This electrical system includes a socket on each vehicle and an electrical connector, having a plug at each end for hooked-up electrical engagement with the socket. One disadvantage of the Greenberg patent is that the electrical connecting member is designed to be stored in the trunk of either or both vehicles, as on a reel, when not in use. Thus, the effectiveness of the invention requires that the electrical connector member is either in the vehicle or nearby when needed. It would be possible that the electrical connector cable will not be available when needed. Thus, it is an object to provide a battery access system which is always available when needed to jump the battery. Such a system should not require a person to go looking for a connector cable, such as in the Greenberg patent but rather, the entire battery access system should be located under the hood of the vehicle.

Accordingly, this invention has the following objects:

To provide an improved battery access system for starting engines having a defective battery;

To provide an improved battery access system for starting engines having defective circuitry between the battery and the starter solenoid;

To provide an improved battery access system which can aid in re-charging a defective battery;

To provide an improved battery access system to eliminate the possibility of incorrect polarity connections;

To provide an improved battery access system which can be used safely;

To provide an improved battery access system which can be totally contained underneath the hood of a vehicle; and To provide an improved battery access system which can also be used to connect external electrical apparatuses to the battery which supplies direct current.

These and other objects of the invention will become apparent from the following disclosure.

SUMMARY OF THE INVENTION

The present invention is an improved battery access system. The access system utilizes electrical cable conductors for conducting an electric current. Terminal attachment devices permit the connection of the access system into the electrical system of a vehicle. An integrated coupling plug permits an electrical connection between the vehicle's electrical system and an external electrical system. The system comprises plug connection device for simultaneously connecting a plurality of the integrated coupling plugs and for establishing an electrical circuit between the electrical system of the vehicle and the external electrical system.

A preferred embodiment of the invention incorporates insulation means disposed about the plug connection device and prevents inadvertent short-circuiting of the electrical circuit and protects a user of the battery access system from hazard.

In one embodiment of the improved battery access system, the electrical cable conductor is comprised of two electrical conducting cables, each having a vinyl insulation about its circumference. The terminal attachment device utilizes a lugged fastener device which facilitates the attachment of the electrical cable conductor to electrical components of the vehicle's electrical system.

The invention can be connected to the electrical system of the vehicle in several manners. In one manner, one of the two electrical conducting cables of the electrical cable conductor is fastened to the starter solenoid of the vehicle's electrical system and the second cable is fastened to a grounding location. In a second manner, one of the two cables is fastened to the positive terminal and the other cable is fastened to the negative terminal of the battery within the vehicle's electrical system.

The integrated coupling plug comprises a first and a second plug member which are integrally attached to the first and second electrical conducting cables, respectively. The first plug member is positioned transverse to the second plug member so as to allow connection to the plug connection device in only one manner. This eliminates the inadvertent connection of opposite polarities of the two electrical systems. In one embodiment of the transverse confirguation of the first and second plug members, the first and second plug members each have a substantially rectangular shape and are substantially proximate to and perpendicular to one another.

The plug connection device is used to connect a plurality of integrated coupling plugs. Thus, the plug connection device comprises a plurality of first and of second plug connection members. A circuiting means completes an electrical circuit between each one of the plurality of first plug connection members and each one of the plurality of second plug connection members, respectively. Although in the embodiment described the plug connection device is used to connect only two integrated coupling plugs, it is possible for the plug connection device to connect a plurality of integrated coupling plugs.

In the preferred embodiment of the invention, the first and second plug members of the integrated coupling plug comprise male prongs and the plurality of first and second plug connection members of the plug connection device comprise female sockets which are shaped to conform to the male prongs of the plug members. In another embodiment, the first and second plug members of the integrated coupling plug comprise female sockets and the plurality of first plug connection members and second plug connection members of the plug connection device comprise male prongs so as to conform to the female sockets of the plug members.

To allow the entire system to be situated under the hood of a vehicle, the plug connection device has mounting means for attachment of the plug connection device to the vehicle. After the electrical cable conductor is connected into the electrical system of the vehicle, the integrated coupling plug is inserted into the plug connection device and can be stored there until the improved battery access system is connected to an external electrical system.

One embodiment of the female socket comprises two metal plates which are separated to allow the male prong to be snugly accommodated when inserted between the plates. The plates are slightly diverging to facilitate passage of the male prong at the end where the male prong first passes between the plates.

A switching means is incorporated in the invention to alternatively break and make the electrical circuit between the electrical system of the vehicle and an external electrical system. In one embodiment of the invention, the switching means is located on the plug connection device. In another embodiment of the invention, the switching means is located on the electrical cable conducting means and alternatively allows and prevents the passage of electric current within one of the electrical conducting cables.

In one version of the improved battery access system the external electrical system is the electrical system of a second vehicle. Connected in this manner, the improved battery access system can be used to start the engine in a vehicle having a defective battery or defective circuitry. In a second version of the invention, the external electrical system may comprise an electrically operated apparatus. Here, an electrical system of the vehicle may be used to supply power to a lighting apparatus through the improved battery access system.

DETAILED DESCRIPTION OF THE DRAWINGS

Figure 1:
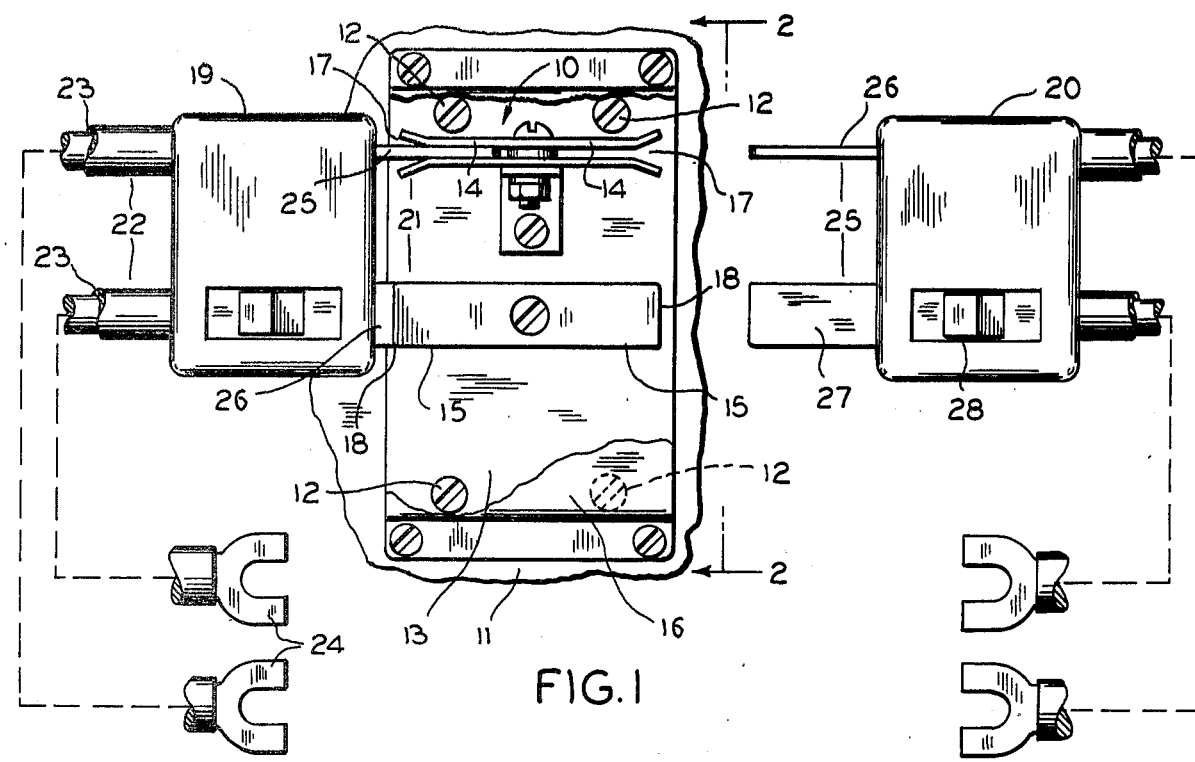
FIG. 1 is an elevational front view of the connection device illustrating an electrical cable conductor on the left side inserted into the connection device and, an electrical cable conductor with the integrated coupling plug extending therefrom on the right side.

While this invention is susceptible of embodiment in many forms, there is shown in the drawings and will herein be described in detail, several specific embodiments, with the understanding that the present disclosure is to be considered as an exemplification of the principles of the invention and is not intended to limit the invention to the embodiments illustrated.

In FIG. 1, plug connection device is shown mounted to vehicle 11 by four sets of screws and nuts 12 positioned in the four corners of baseplate 13, in this embodiment.

Only one embodiment of plug connection 10 is shown here. Plug connection device 10 consists of two sets of plug connection members, 14 and 15, extending from each side of plug connection device 10. Insulating device 16, such as a container, encloses each plug connection member 14 and 15 of plug connection device 10, except for first ends 17 and 18, respectively, so as to allow insertion of electrical cable conductors 19 and 20 and is disposed about plug connection device 10 to prevent short circuiting of an electrical circuit.

Additionally shown in FIG. 1 are two electrical cable conductors 19 and 20. Electrical cable conductor 19 is shown inserted into plug connection device 10 by integrated coupling plug 21. Electrical cable conductor 19 shows two electrical conducting cables 22 with insulation 23 about the circumference of each and terminal attachment devices 24. Terminal attachment devices 24, such as solderless lugs, may be used to connect electrical cable conductor 19 to a vehicle's electrical system.

Electrical cable conductor 20 shows integrated coupling plug 25 prior to insertion into plug connection device 10. In this embodiment, a first plug member 26 is perpendicular to a second plug member 27. The perpendicularity of plug members 26 and 27 allows only one manner of inserting electrical cable conductors 19 and 20 into plug connection device 10. This provides the correct polarity connection when electrical cable conductors 19 and 20 are inserted into plug connection device 10 and terminal attachment devices 24 are connected to electrical apparatuses.

In this embodiment, each plug member 26 and 27 of electrical cable conductors 19 and 20 are male-pronged and each plug connection member 14 and 15 of plug connection device 10 is made a female socket.

Electrical cable conductor 20 has a switching device 28 shown. Switching device 28 can also be positioned on plug connection device 10. Switching device 28 is used to alternatively break and make an electrical circuit between the electrical system connected to electrical cable conductor 19 and the electrical system connected to electrical cable conductor 20 when electrical cable conductors 19 and 20 are inserted into plug connection device 10.

Figure 2:
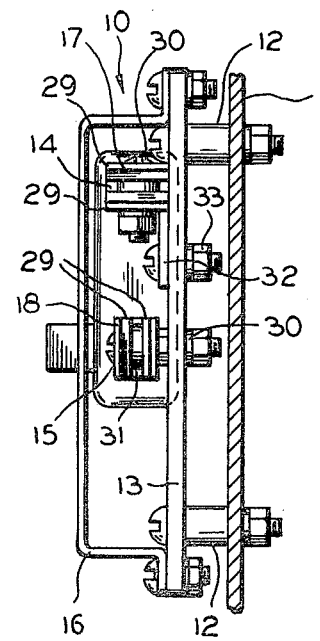
FIG. 2 is a cross-sectional side view of the connection device as shown in FIG. 1 taken along lines 2—2 and looking in the direction of the arrows.

FIG. 2, being a cross-sectional side view of plug connection device 10, shows plug connection members 14 and 15 perpendicular to one another. Each plug connection member, 14 and 15, being a female socket, is composed of two metal plates 29 separated so as to snugly accommodate male-pronged plug members 26 and 27. At first ends 17 and 18 of plug connection members 14 and 15, respectively, metal plates 29 diverge to allow easier insertion of male-pronged plug members 26 and 27 of electrical cable conductors 19 and 20. Two metal plates 29 are fastened together by a fastener 30, a screw and nut, for example, and are separated by a washer 31, having a thickness approximate to the thickness of male-pronged plug members 26 and 27. Plug connection member 14, shown in horizontal is attached to base plate 13 by L-member 32, which is connected to fastener 30 of plug connection member 14 and then fastened to base plate 13 by another fastener 33. Insulating device 16 is shown allowing access to plug connection members 14 and 15 only through first ends 17 and 18 of plug connection members 14 and 15. Insulating device 16 and base plate 13 are shown connected to vehicle 11 by screw and nut sets 12.

Figure 3:
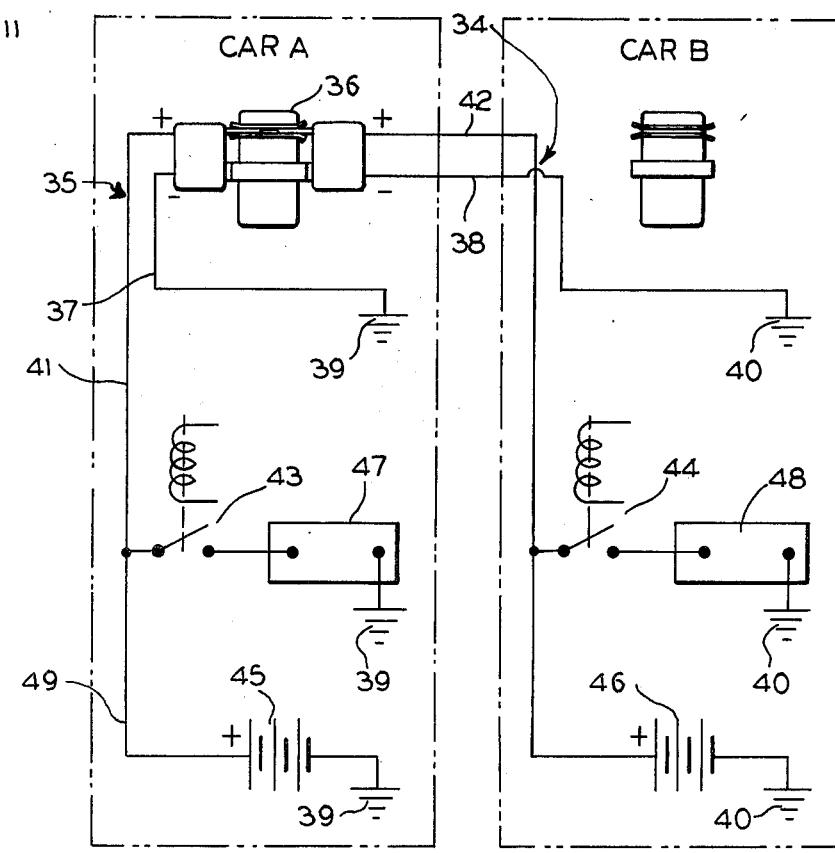
FIG. 3 is a schematic of the electrical system of two vehicles, showing the electrical cable conductor of Car B connected with the electrical cable conductor of Car A through the present invention.

FIG. 3 shows one embodiment of a schematic of the electrical circuit when electrical cable conductor 34 of Car B and electrical cable conductor 35 of Car A are inserted into plug connection device 36 of Car A. One of two electrical conducting cables 37 and 38 of each electrical cable conductor 34 and 35 is fastened to grounding locations 39 and 40, respectively. The second electrical conducting cable 41 and 42 of each electrical cable conductor 34 and 35 is fastened to the starter solenoid 43 and 44 of the respective automotive electrical system. Each starter solenoid 43 and 44 is already connected to battery 45 and 46 of Car A and Car B, respectively. Each battery 45 and 46 is also fastened to grounding locations 39 and 40, respectively. Starter solenoids 43 and 44 are in turn connected to starter 47 and 48, respectively. Starters 47 and 48 are also connected to their respective grounding locations 39 and 40.

The improved battery access system, connected as shown in FIG. 3, will allow the vehicle having the defective battery, Car A in this embodiment, to be started even though the electrical circuitry 49 between battery 45 and starter solenoid 46 may be defective. No reliances for starting Car A are placed on either defective battery 45 or electrical circuitry 49.

The foregoing description of the drawings merely explains and illustrates the invention and the invention is not limited thereto, except insofar as the dependent claims are so limited, as those skilled in the art who have the disclosure before them will be able to make modifications and variations therein without departing from the scope of the invention.

What is claimed is:

1. An improved battery access system comprising:
    electrical cable conducting means for conducting an electric current;
    terminal attachment means affixed to a first end of said electrical cable conducting means for connection of said access system into a first vehicle's electrical system;
    integrated coupling plug means affixed at a second end of said electrical cable conducting means for electrically connecting said first vehicle's electrical system into a second electrical system external to that of said first vehicle;
    said integrated coupling plug means having a plurality of conducting members associated therewith;
    plug connection means which slideable accommodates the conducting members of said integrated coupling plug means of said first vehicle and which simultaneously slideably accommodates conducting members of external coupling plug means from said external electrical system thereby connecting the electrical conducting members of said external electrical system with the electrical conducting members of said first vehicle;
    a portion of said electrical cable conducting means capable of being removeable from either said first vehicle or said external system to permit said simultaneous connection of said conducting means into said plug connection means.

2. The improved battery access system according to claim 1 in which the invention further comprises:
    insulation means disposed about said plug connection means so as to prevent the inadvertent short circuiting of said electrical circuit and to protect a user of said battery access system.

3. The invention according to claim 1 in which said electrical cable conducting means comprises:
    two electrical conducting cables; and
    an insulation about the circumferences of one or more of said two cables.

4. The invention according to claim 1 in which said terminal attachment means comprises:
    lugged fastener means for facilitating attachment of said first end of said electrical cable conducting means to one or more electrical components of said first vehicle's electrical system.

5. The invention according to claim 3 in which:
    one of said two cables is fastened to a starter solenoid of said automotive electrical system of said first vehicle through said terminal attachment means, and
    said second of said two cables being fastened to a grounding location on said first vehicle by said terminal attachment means.

6. The invention according to claim 3 in which:
    one of said two cables of said electrical cable conducting means is fastened to the positive and negative terminals of a battery within said first vehicle's electrical system, respectively.

7. The invention according to claim 3 in which said plurality of conducting members of said integrated coupling plug means comprises:
    a first plug member integrally attached to said first of said two cables;
    a second plug member integrally attached to said second of said two cables; and
    said first plug member being positioned transverse to said second plug member so as to require connection to said plug connection means in one manner, thereby eliminating the inadvertent connection of opposite polarities.

8. The invention according to claim 7 in which said transverse configuration of said first and second members of said integrated coupling means comprises:
    said first and second plug members each having a substantially rectangular shape; and
    said first and second plug members being substantially proximate to and perpendicular to one another respectively.

9. The invention according to claim 7 in which said plug connection means comprises:
    a plurality of first plug connection members;
    a plurality of second plug connection members; and
    circuiting means for completing an electrical circuit between each one of said plurality of first plug connection members and each one of said plurality of second plug connection members, respectively.

10. The invention according to claim 9 in which:
    said first plug member and said second plug member of said integrated coupling plug means comprise female sockets; and
    said plurality of first plug connection members and second plug connection members of said plug connection means comprising male prongs shaped to conform to said female sockets.

11. The invention according to claim 9 in which:
    said first plug member and said second plug member of said integrated coupling plug means comprise male prongs; and
    said plurality of first plug connection members and second plug connection members of said plug connection means comprising female sockets shaped to conform to said male prongs.

12. The invention according to claim 1 in which said plug connection means further comprises:
mounting means for attachment of said plug connection means to said first vehicle.

13. The invention according to claim 11 in which each of said female sockets comprises:
two metal plates;
said plates being separated to allow said male prong to be snugly accommodated when inserted therebetween;
said plates having a first end through which said male prong first passes when inserted therebetween; and
said plates at said first end slightly diverging to facilitate passage thereinto of said male prong.

14. The improved battery access system according to claim 1 in which the invention further comprises:
switching means for alternatively breaking and making said electrical circuit between said electrical system of said first vehicle and said external electrical system.

15. The invention according to claim 3 in which said electrical cable conducting means further comprises:
switching means for alternatively allowing and preventing the passage of electric current within one of said electrical conducting cables; and
said switching means being located on said electrical cable conducting means intermediate to said terminal attachment means and said integrated coupling plug means.

16. The improved battery access system according to claim 1 in which said external electrical system comprises:
an electrical system of a second vehicle;
said electrical system of said second vehicle including integrated coupling plug means equivalent to said integrated coupling plug means of said first vehicle;
said integrated coupling plug means of said first and second vehicles being connected into an electrical circuit by said plug connection means.

17. The improved battery access system according to claim 1 in which said external electrical system comprises:
an electrically operated apparatus.

* * * * *

UNITED STATES PATENT AND TRADEMARK OFFICE
CERTIFICATE OF CORRECTION

PATENT NO. : 4,157,492
DATED : June 5, 1979
INVENTOR(S) : Nick P. Colbrese

It is certified that error appears in the above—identified patent and that said Letters Patent are hereby corrected as shown below:

Col. 5, line 63       "conducting means" should be --conducting members--.

Signed and Sealed this

Thirteenth Day of November 1979

[SEAL]

Attest:

RUTH C. MASON
Attesting Officer

LUTRELLE F. PARKER
Acting Commissioner of Patents and Trademarks